Figure 3:
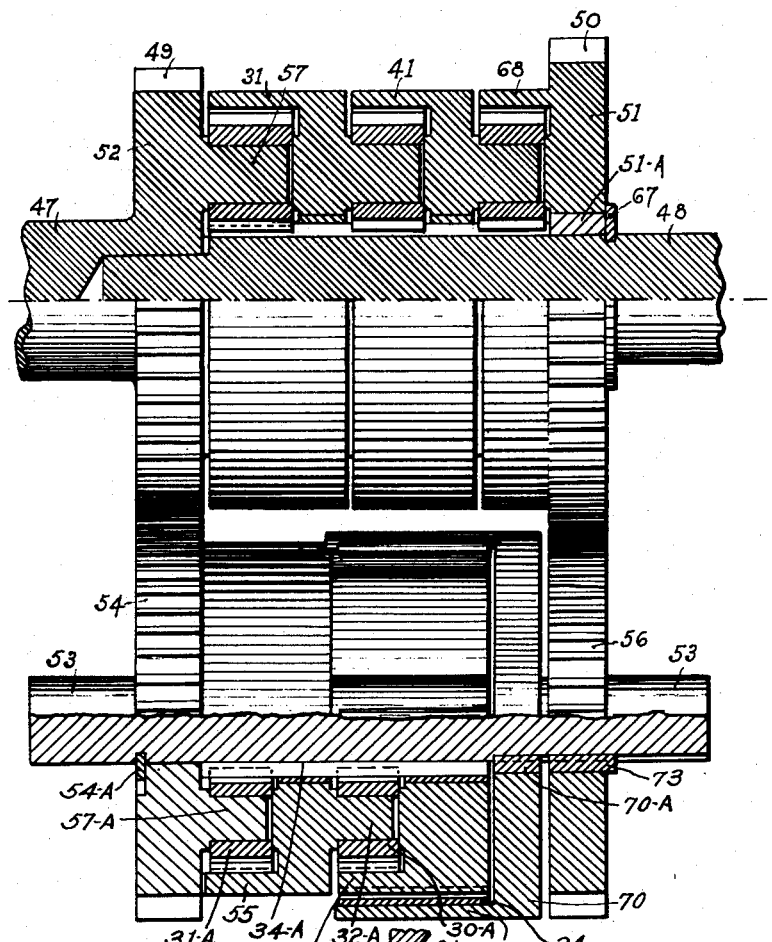

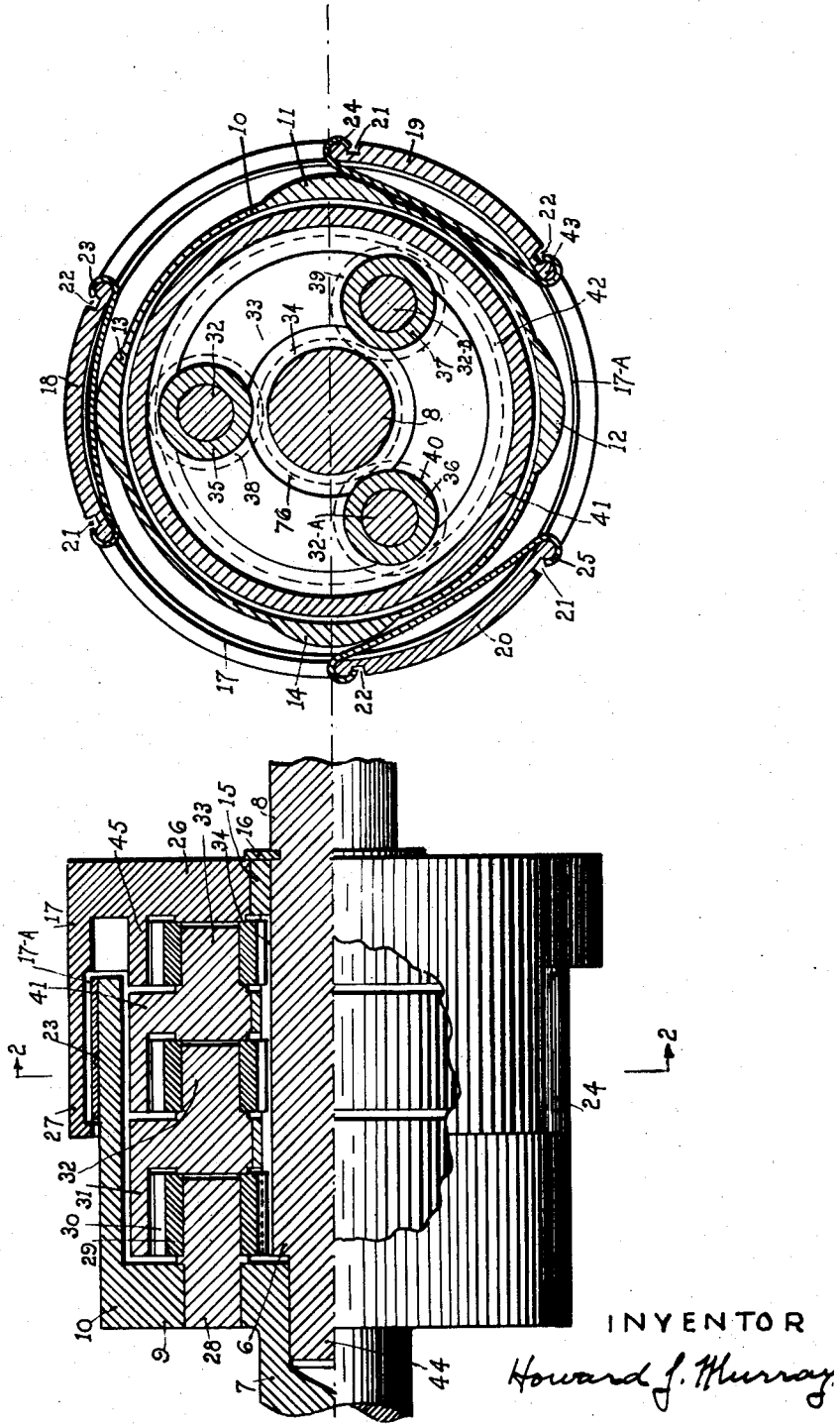

Patented Aug. 22, 1939

2,170,208

UNITED STATES PATENT OFFICE 2,170,208

VARIABLE SPEED POWER TRANSMISSION DEVICE WITH SPEED-TORQUE ACTUATED GIVE-AWAY CONTROL

Howard J. Murray, New York, N. Y.

Application April 22, 1936, Serial No. 75,768

13 Claims. (Cl. 74—259)

My invention relates in general to an automatic variable speed power transmission device and specifically relates to a device for automatically effecting and affecting slip-drive and non-slip speed drive relations between driving and driven members of a power transmission mechanism.

One of the objects of the present invention is to provide a simple form of power transmission mechanism arranged to employ a comparatively small portion of the total power transmitted by the driving member to automatically control slip-drive and nonslip-drive relations of the driving and driven members of the said transmission mechanism.

A further object of the present invention is to provide an automatic speed drive mechanism arranged to be automatically controlled in its speed drive relation by slip-drive elements in turn controlled as a function of the speed of the driving member and the resistance of the driven member.

An additional object of the present invention is to employ a simple give-away slip-drive couple to effect and affect the transmission of power from a driving member to a driven member under such conditions that the speed of the driven member may be relatively varied to assume a proper speed-torque drive relation with the driven member.

A still further object of the present invention is to provide a universal speed drive mechanism arranged to be normally automatically operative and selectively inoperative.

The present disclosure contemplates the use of means including a resilient give-away slip-drive couple arranged to affect driving and driven elements of a differential gear organization including a plurality of differential speed sets in such a manner that the control of the said couple is in effect mechanically multiplied to control the individual action of each of the sets to cause same to collectively effect and affect the transmission of power from the driving member to the driven member.

The present invention is a developement of the disclosure included in my United States patent application Serial No. 66,876, filed March 3, 1936, and entitled "Variable speed power transmission with unidirectional clutch".

In application No. 66,876 there is disclosed a combination of means including a rotatable field producing element and an associated rotatable armature for receiving a small portion of the total power delivered by the driving member to thereby control the speed-torque driving relations of the driving and driven members.

It was found in operation of the device of the said application disclosure that a relative slip between the field producing element and the associated armature is necessary at all times during the transmission of power from the driving member to the driven member in order to produce the necessary holding current. The production of this holding current represents a loss of power during all driving relations and especially during conditions as the driving member and the driven member are rotating at approximately the same speed, or at the same speed. As this condition exists during a large portion of the time in the normal operation of an automotive vehicle, such loss is objectionable however small.

Accordingly the present disclosure includes means for effecting a nonslip-drive relation when the driving and driven members are rotating at the same speed and a slip-drive relation when the driving and driven members are rotating at different speeds. Thus the efficiency of the present device is very high when the driving and driven members are rotating at the same speed.

According to the present disclosure the losses are very small when the driving and driven members are rotating at different speeds. This is due to the fact that the give-away slip-drive control couple is not essentially a friction device, but so formed that power is transmitted by and between rotating elements with a minimum of frictional loss.

While the present invention is obviously capable of use in any location where it is desired to receive power from a driving member, the present invention is particularly applicable to a power transmission mechanism designed for use in connection with automotive construction, and it is in this connection that the embodiments of the present invention will be described in detail.

Various other objects and advantages of the present invention will be in part obvious from an inspection of the accompanying drawings and in part will be more fully set forth in the following particular description of mechanism embodying the present invention, and the invention also consists in certain new and novel features of construction and combination of parts hereinafter set forth and claimed.

Figure 4:
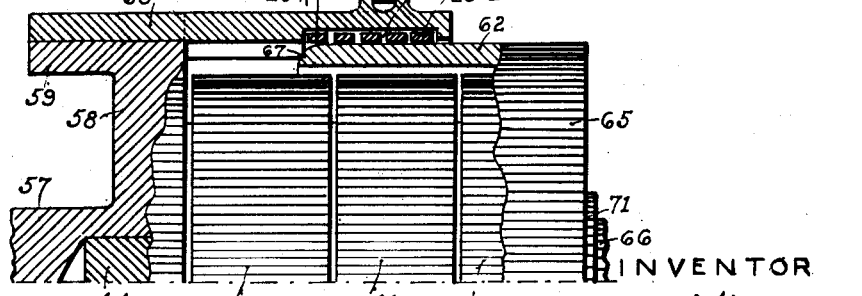

In the drawings:

Figure 1 is an embodiment of my invention partly in vertical section, taken axially of the main shaft; and Figure 2 is a transverse sectional view taken approximately upon the line 2—2 of Figure 1, looking in the direction indicated by the arrows; and Figure 3 is an embodiment of my invention showing a modification of same partly in vertical section, taken axially along the main shafts of same; and Figure 4 is an embodiment of my invention showing an embodiment of same including means for controlling same in vertical section, taken axially of the shaft.

In the following description and in the claims, parts will be identified by specific names for convenience of expression, but they are intended to be as generic in their application to similar parts as the art will permit.

There is shown by Figure 1 of the drawings a a novel resilient slip-drive couple and associated power transmission elements constituting collectively an automatic universal speed transmission mechanism and including a pair of power shafts 7 and 8 disposed in axial alignment with their adjacent ends including the reduced portion 44 of the shaft 8 interfitted to provide proper bearing surfaces.

The power shafts 7 and 8 are mounted for independent rotary movement respectively in suitable bearings (not shown). While either of these power shafts 7 and 8 may be considered as the driving member of the mechanism, for the purpose of this description, it will be considered that the shaft 7 is the normal driving member, and is operatively connected to be driven from a source of power such as an internal combustion engine (not shown).

Accordingly, shaft 8 is regarded as the normal driven member, and is operatively connected to whatever mechanism (not shown) it is desired to drive from this mover 8.

The shaft is preferably made of a good quality of steel and formed with teeth or splines 34 to operatively receive a plurality of groups of planet gears as 38, 39 and 40 (see Figure 2) forming together with the annular gears 31, 41 and 45 and the teeth 12 a plurality of differential speed gear sets all connected in speed driving relation with the driven member 8, one of the sets in driving relation with the driving member 7.

The planet gears are supported and positioned by the bearings 28, 32 and 33 of the annular gears 31, 41 and 45 so as to be constantly in mesh with the sun teeth 34, and to rotate therewith. The outer gears 31, 41 and 45 are positioned and supported by the splined bearings 76.

With this arrangement it is evident that each planet gear is constantly in mesh with portions of the sun teeth 34 and one of the annular gears 31, 41 and 45.

In passing it should be noted that the teeth 34 forming portions of the normally driven shaft 8 are in reality sun gears to be considered as an integral member for the purpose of this description, and that each sun portion is a part of a differential gear set. It is evident that a plurality of separate sun gears could be assembled on the driven shaft 8.

In this event it is obvious that power may be transmitted by and between the power members 7 and 8 by a plurality of power transmission paths, and that each of these paths will act as a means to transmit power in some proportion to the retardation of the rotation of the said differential sets. It is also evident that any retardation of the rotation of the annular gear 45 will be transmitted to the other annular gears.

The annular gear 45 forms a portion of the disc shaped member 26 also formed with a cylindrical portion 17 from which extend 3 curved fingers 18, 19 and 20 symmetrically positioned about the axis of the driven shaft 8. These fingers are grooved on the ends as at portions 21 and 22 and rounded to provide bearings for the springs 23, 24 and 25 when moved into position in the recess 17—A formed in the said fingers as shown on Figure 2.

Thus any retardation applied to the springs 23, 24 and 25 will be transmitted to the fingers 18, 19 and 20 and thereby to the member 26 and thence to the teeth 42 of the annular gear 45, and as hereinbefore stated to the differential gear sets including the annular gears 31 and 41. The member is positioned on the shaft 8 by the lock ring 16 and supported for rotation on the bearing 15.

The normally driving member 7 is formed with a cylindrical extension 10 a portion of which is cut away to form the raised portions 11, 12, 13 and 14. It is assumed that the member 7 is made of a good quality of steel and that the raised portions 11, 12, 13 and 14 are rounded and smooth. In the embodiment shown in Figure 1 more raised portions are provided with the member than there are springs mounted on the member 26.

In Figure 3 there is shown a modification of the invention shown in Figure 1. The means supported on the shaft 53 is identical with the means shown on the shafts 7 and 8 of Figure 1 except that the portion 9 of Figure 1 is provided with teeth 54 and loosely mounted on the shaft 53 and the member 26 is provided with the teeth 56 and mounted on the shaft 53 instead of shaft 8. All the other portions of Figure 1 are similar in form and operation to the parts of Figure 2. The parts mounted on the shafts 47 and 48 of Figure 3 are also similar to the parts of Figure 1 except that the cylindrical portion 10 of the member 7 have been replaced by the teeth 49 of the member 47, and the spring supporting portion 17 of the member 26 has been replaced by the teeth 50 of the member 51.

Thus in effect the slip-drive couple including the raised portions 11, 12, 13 and 14 and the springs 23, 24 and 25 of Figures 1 and 2 have been replaced by the means supported on the shaft 53 and the gear 56 keyed to the shaft 53 by means of the key 75.

In Figure 4 there is shown means for disconnecting and connecting the raised portions and the springs of Figure 1 into and out of operative relation. The differential gear sets including the annular gears 31, 41 and 72 (see gear 45 of Figure 1) are shown mounted on the driven shaft 66. The normally driving shaft 57 is formed with a portion 58 and a flanged portion 59 grooved to receive, guide and support the axially shiftable member 60 including a shift finger slot portion 63 for receiving the shift finger 64 connected to a conventional shift rod (not shown) and a conventional shift rod locking means (not shown). It is understood that the said shift rod may be moved by the application of proper power or force.

The springs 23—A to 23—E are assumed to collectively move axially with a movement of the shiftable member 60 in either axial direction. The cammed portion 62 forming a portion of the member 65 is assumed in this particular embodiment to be axially fixed, altho it is obvious that it could be provided to be axially shiftable in the same manner as the member 60 without departing from the spirit of the invention. The portion 62 is provided with a cammed end surface 67 and is assumed to rotate with the annular gear 72. The springs 23—A to 23—E are supported on the portion 60 in the same manner that the springs 23, 24 and 25 are supported on the member 17 of Figure 1.

In operation, let it be assumed that the source of motive power (not shown) is connected to the normally driving member 7 of Figure 1 by means of the conventional foot clutch as commonly found on automotive vehicles, altho it is possible according to the present disclosure to operate a vehicle equipped with the present device without any foot clutch, or any type of clutch between the source of power and the member 7.

Let it be further assumed for the purpose of this description that the source of power when connected to the normal driving member 7 will rotate the same clock-wise when viewed from the left hand end of Figure 1. The device to be driven such as an automotive vehicle is assumed to be connected to the driven shaft 8 normally driven in the same direction as the driving shaft 7.

In this event the planet gears such as 35, 36 and 37 will rotate about their shafts 28, 32 and 33 as they revolve about the shaft 8 due to their driving relation with the teeth 34 when the shafts 7 and 8 are rotating at different speeds. The annular gears 31, 41 and 35 will also move clock-wise or in the same direction as the rotation of the normally driving shaft 7.

As hereinbefore stated the present disclosure is a development of the invention disclosed in my prior application Serial No. 66,876 filed March 3, 1936. The arrangement of the planet gears, annular gears and sun teeth are alike in both applications. Likewise the speed driving relations and the methods of obtaining universal speed drive relations is completely disclosed in this prior application except rotatable electro-magnetic couple elements are shown in place of the give-away slip-drive elements of the present application. It is obvious that no additional teaching will be obtained by duplicating such teaching in this application insofar as the differential relations of the gears are concerned.

It will be observed that a differential speed relation between the members 7 and 8 and the member 26 of Figure 1 will be positively maintained at all times. If the members 7 and 8 rotate at the same speed, the member 26 will also rotate at the same speed. If the member 8 rotates at a slower speed than the member 7, then the member 26 must assume a speed in order to maintain such differential relations. As the speeds of the members 7 and 8 vary, the relative speeds of the portions 10 and 17 vary in a definite differential relation to such variation. Thus with a variation in the speeds of the power members 7 and 8, the springs 23, 24 and 25 of Figure 2 will be rotated relative to the raised portions 11, 12, 13 and 14. The springs 23, 24 and 25 are normally in the path of the raised portions 11, 12, 13 and 14, and thus the springs must be flexed in order to have relative motion between the portions 10 and 17.

If the raised portions do not have sufficient momentum or torque to flex the springs there can be no relative motion between the members 10 and 17.

Now let it be assumed that the engine upon the vehicle has been started, and that the conventional foot clutch is "out". If the said clutch is let "in" the member 7 will start to rotate, and will tend to rotate the driven member 8 through the differential sets of Figure 1. But the member 8 is connected to the vehicle, and will offer a resistance against rotation and will remain stationary. Thus the member 26 must rotate to maintain a differential relation as hereinbefore stated, and if sufficient resistance is offered by the member 8, the raised portions will be forced by the springs.

It should be noted that the give-away slip-drive couple formed by the springs and the cammed raised portions of Figures 1 and 2 is not essentially a frictional device. The parts may be made of steel with smooth surfaces and be continually immersed in oil, or some lubricating medium. In addition the areas may be very large, and thus the unit pressures comparatively small, and with large heat radiating areas. The radius of the springs and the raised portions is not limited, and thus the device may be designed so that the torque relations are very much smaller that the torque values given the members of the differential sets. In addition, the springs may be very wide, in fact, so wide as to employ the entire space between the members 10 and 26. As the springs are widened they will be thinner for a given set of conditions, and thus internal strains in the springs may be reduced to a minimum.

The give-away slip-couple is therefore a torque transmitting device, and the springs and the cammed portions move into and out of slip and non-slip relations as a function of the speed of the member 8 (when driving) and the resistance of the member 7 (when acting as a driven member).

With the member 7 rotating and the member 8 held stationary by its load, the cammed portions will continue to move with the member 7, and the springs and the member 17 will be accelerated clock-wise (left-hand view). Thus the cammed portions 11, 12, 13 and 14 will tend to retard the springs 23, 24 and 25, and power will be transmitted by the member 17 to the member 10 due to its relative speed and the torque required to pass the springs by the cammed portions of the member 10.

As the speed of the driving member is increased, the relative speeds of the members 10 and 26 will be increased even though the member in effect continues to be restrained. While the action between a spring and a cammed portion may be considered as intermittent, the combined action of all the springs and all the cammed portions of the member 10 will approach as constant restraint, as it is evident that a comparatively large number of springs, and a different large number of cammed portions may be employed. Thus, for the purpose of this description, let it be assumed that the restraining action of the member 10 on the member 26 is approximately constant as it accelerates relative to the member 10. As the relative speed of the members 10 and 26 continues to increase, the torque imparted to the member 8 will increase until its load resistance is overcome, and the member 8 will start to rotate. As the speed of the member 8 increases the relative speed of the members 10 and 26 will decrease under normal operating conditions, because the torque resistance of the member 8 will decrease as it increases in speed under normal conditions. When the speed of the member 8 has reached the speed of the member 7 all the parts shown in Figure 1 will all be rotating at the same speed. There will be no relative movement between any of the parts, and thus the highest possible transmitting efficiency will be obtained. When all parts are moving at the same speed as condition of direct drive is obtained and there will be no relative movement between the cammed portions and the springs, and the spring (as 24, see Fig. 2) will constantly be driven (or will drive) by the cammed portion (11) to maintain this direct drive condition as long as the load resistance on the member 8 does not exceed that required to force the springs and cammed portions out of a non-slip relation.

It is obvious that a greater torque must be applied to cause relative motion between the springs of the member 26 and the member 10 than to maintain a non-slip relation. Thus in general it may be assumed that the restraint in terms of torque is greater when the members 7 and 8 and rotating at different speeds. In actual operation the torque-speeds of the members 7 and 8 are constantly changing. Member 8 may be the driven member one instant, and member 7 the driven member the next instant. In addition, the sizes and number of differential sets may be varied, the size and number of springs and cammed portions may be varied, and thus a specific set of conditions would be of no value from a general standpoint. In general, however, according to the present disclosure the frictional loss created in the couple by the slip between the springs and the cammed portions may be made very small compared to the power transmitted by and between the springs and the cammed portions.

When the member 8 becomes the driving member, the member 26 will be rotated counterclockwise. All of these relative movements between the members 7, 8 and 26 may be seen by reference to Figure 6 of my co-pending application Serial No. 66,876 filed March 3, 1936.

According to the present disclosure the percentage of the total power transmitted through the path formed by the slip-drive couple decreases as the number of differential sets is increased.

Let it be assumed that with one set of differential elements, one-half of the total power would be transmitted through the elements of the said couple, then with two differential sets only one-fourth of the power would be transmitted.

With the arrangement shown by Figures 1 and 2 only one-eighth of the total power would flow through the said couple. An additional differential set would cut the power flowing through the couple to one-sixteenth. Thus there is no limit to the smallest percentage required for controlling the transmission of power through the main path or the differentials. Theoretically the control power required may approach zero, actually it is determined by practical limitations. Thus the torque applied between the springs 23, 24, and 25 of Figures 1 and 2 may be very small compared to the torques created between the members 7 and 8 with a corresponding decrease in the work done by the said couple, and also an increase in its sensibility.

In Figure 3 there is shown a method of still further decreasing the percentage of control power required for variable speed control between the members 7 and 8. In effect the means of Figure 2 constitutes a duplication of the means of Figure 1 to provide three paths for the transmission of power between the members 7 and 8. In the main path (or upper path) all the different sets are in driving relation with the driven member 8 and with each other, one set is in driving relation with the normally driving member 7. In the second path including elements 54, 55, 31—A, 32—A and 30—A mounted on the shaft 53 are differential sets all in driving relation with the shaft 53 and with each other, one of the sets is in driving relation with the driving member by means of the teeth 52 and 54, and the shaft 53 is in driving relation with one of the upper differential sets by means of the teeth 50 and 56.

The third path is formed by the give-away slip-drive couple 69—A and 69—B similar in all respects to the slip-drive couple shown in Figures 1 and 2. If three differential sets are mounted on the shaft 53 then as hereinbefore stated only one-eighth of the power flowing through the path supported by the shaft will normally be needed for control of the power flowing through the said path.

But the entire path supported by the shaft 53 in turn is a control for the differential set including the annular gear 68 in turn requiring only one-eighth of the power flowing through the power transmitting path supported by the members 7 and 8. Thus only one-eighth of one-eighth or one sixty-fourth of the total power transmitted from the member 7 to the member 8 will normally flow through the control couple elements of Figure 3. If only one additional differential set be added to the means of Figure 3, it is obvious that only one-sixteenth of one-sixteenth or one two-hundred-and-fifty-sixth of the power will have to be transmitted by and between the slip-drive couple elements. If the gear 51 has more teeth than are included on the member with teeth 56 (or less) it is obvious that overspeed drive relations may exist between the members 7 and 8 as the couple elements 55 and 69 rotate at the same speed. This may again be varied by varying the numerical relation of the teeth 49 and 54.

In Figure 4 there is shown a modification whereby the slip-drive couple elements may be moved into and out of operative relation when desired or automatically (not shown). The differential sets 31, 41 and 72 are similar to the differential sets shown by Figures 1 and 2. The elements of the slip-drive couple of Figure 1 have been reversed so that the driving member 57 rotates the resilient spring means 23—A to 23—E, and the cammed portions are supported and rotated by the member 72.

The operation of the means of Figure 4 are the same as the operation of the means of Figures 1 and 2, except that a plurality of springs 23—A to 23—E are employed to be axially moved by the shift finger 64 in either direction with the axially shiftable member 60 formed to rotate with the driving member 57 as it is moved axially. The portion 59 is provided with teeth between which fingers formed in the member 60 move. The shift finger 64 is positioned and moved by a conventional shift rod (not shown) associated with means for locking same in a plurality of positions in its axial path in a conventional manner (not shown). Thus the member 60 may be moved so that one or more of the springs 23—A to 23—E are placed in the path of the raised portions of the member 62, or the member 60 may be moved so that the springs are entirely out of the path of the said raised portions. Thus a selective degree of restraint may be obtained by the shift finger 64 when the same is moved manually or otherwise.

While I have shown and described and have pointed out in the annexed claims certain new and novel features of my invention, it will be understood that certain well known equivalents of the elements illustrated may be used, and that various other substitutions, omissions and changes in the form and details of the devices illustrated and in their operation may be made by those skilled in the art without departing from the spirit of the invention.

Having thus described my invention, I claim:

1. A device for controlling the power transmitted by and between a pair of power members whereby the members will assume a proper speed-drive relation, said device including means constituting a plurality of power transmitting paths in parallel relation between said members, one of said paths including differential speed driving sets each in speed driving relation with one of the members and with adjacent sets, one set in driving relation with the other member, a second path in parallel relation to the first mentioned path including differential speed driving sets each in speed driving relation with adjacent sets and one of the sets of the first mentioned path, one set of said second path in driving relation with one of the members, a rotatable normally positive-drive speed-torque responsive control couple constituting a third path in parallel relation to the second mentioned path and including a couple portion formed by a plurality of resilient elements connected to one of the first mentioned path sets and a second couple portion formed with a plurality of resilient element actuators operatively connected to a part of one of the sets of the said second mentioned path, said resilient elements being automatically changeable from a positive drive portion to a slip-drive portion as a result of the resistance of the driven member.

2. A combination positive-drive give-away drive device for affecting and effecting variable speed-torque driving relations between a driving member and a driven member of an automotive vehicle, comprising a main power transmitting path between said members and a control power transmitting path between the said members, said main path including differential speed drive sets each connected to the driven member and to adjacent sets, one of the main power path sets connected to the driving member, said control path in parallel relation to said main path and comprising differential speed drive sets connected in driving relation with one of the main path sets and to adjacent sets, one set of the said control path sets in driving relation with the driving member, and rotatable normally positive torque responsive give-away drive portions comprising a drive control couple connected to one of the main path control sets and a control path set for deriving speed effecting and affecting power from one of the members, one of said couple portions including resilient elements arranged to change automatically from positive drive elements to give-away drive elements according to the resistance of the driven member.

3. A torque controlled combination positive-drive slip-drive device for automatically connecting a driving member and a driven member in positive drive relation and in slip-drive relation according to the torque resistance of the driven member, constituting a main power transmitting path between said members including axially positioned differential sets connected to each other, one of the said sets connected to one of the members and all of the sets connected to the other member, and a rotatable couple including a plurality of resilient portions connected to one of the members and a plurality of resilient portion actuators connected to one of the sets, said resilient portions and said actuators acting as positive drive couples acting as a positive drive during periods of normal driving torque and as slip-drive portions during periods of excessive torque.

4. An automatically and manually controlled device for associating driving and driven power members in positive and slip-drive speed relations, constituting a differential gear drive arrangement between the said members, a rotatable control couple including elements connected to one of the gears of the said arrangement and co-acting actuators for the said elements connected to one of the members, and manually actuated means for selectively and variably connecting the elements and the actuators of the said couple in operative relation thereby to manually vary the combined resistance of the elements and thereby the relations of the said couple.

5. The combination of means including a driving member and a driven member, means including speed drive sets each in speed driving relation with one of the members and with each other, give-away clutching means constituting a slip-drive power transmission control couple including resilient elements operatively connected to one of the members and element actuator means forming portions of one of the sets, and shiftable means for relatively and progressively moving the said elements and said actuator portions into and out of coacting relation thereby to selectively and progressively vary the give-away action of the said elements when associated with the said actuators.

6. In a device of the class described, the combination of a pair of power members adapted to be automatically disposed in speed-torque driving relations proportional to the resistance of the driven member, mechanism including abutting differential speed driving sets in speed driving relations with one of the members and with each abutting set, one set in driving relation with the other member, a rotatable give-away slip-drive power transmission control means normally acting as a positive drive means and controlled by the speed of one of the members and the resistance of one of the sets for causing the said control means to automatically change from a positive-drive to a slip-drive status and thence return to a positive-drive status, and shiftable means for causing the said rotatable means to become inoperative and thereby disconnect the said power members from a driving relation.

7. A device for effecting and affecting speed drive relations between driving and driven power members, comprising speed drive sets each in driving relation with one member and with adjacent sets, one set in driving relation with the other member, and a rotatable torque responsive resilient slip-drive couple including rigid cammed portions and active resilient elements in operative relation with one of the members and one of the sets, and shiftable means for progressively disconnecting the active elements of the couple from operative relation with the cammed portions.

8. A slip-drive device for automatically coupling a driving member with a driven member in positive and variable speed drive relations, comprising a plurality of normally unrestrained differential speed drive organizations each connected to the driving member and to each other, one organization connected to the driven member, and manually controlled means for rendering one of the said organizations partially restrained and therethrough all the other said organizations restrained to a relatively greater degree, said restraining means including a rotatable resilient normally positive-drive torque responsive couple including an element connected to one of the members and an element connected to one of the organizations arranged to approach and maintain speed drive relations of the said members as a function of the speed of one of the members and the resistance of the other.

9. A normally positive power actuated device for automatically connecting a driving member and a driven member in speed-torque drive relations, including gear sets arranged to provide progressively divisible power transmitting paths, and a bidirectional normally positive drive control couple including relatively rotatable rigid and resilient elements normally in positive drive relation and constituting the last division of one of the said power transmitting paths, said rotatable control couple elements adapted to be automatically forced into a slip-drive relation during periods of relatively great resistance of the driven member, and manually actuated means for progressively disconnecting the couple elements from operative relation.

10. A resilient drive power transmitting device for automatically associating a driving member and a driven member in speed-torque drive relations, including speed-torque driving sets each connected to the driven member and to each adjacent set, one of the said sets connected to the driving member, and a resilient control couple operatively associated with the driving member and one of the sets and therethrough with each of the said sets to automatically effect and affect universal speed-torque driving relations between the members as a function of the speed of the driving member and the resistance of the driven member.

11. A device for automatically and semi-automatically effecting and affecting universal speed-torque drive relations between a driving member and a driven member, comprising power transmitting paths, one of said paths including speed-torque sets each arranged in speed-torque driving relation with the driven member and to each contiguous set, one of said sets in driving relation with the driven member, a second path in parallel relation with the first mentioned path and including speed-torque driving sets each arranged in speed-torque driving relation with one of the sets of the first mentioned path and to each contiguous second path set, one of the said second path sets in speed driving relation with the driving member, and a bidirectional slip-clutch couple normally in positive driving relation with one of the sets of the second mentioned path and the driven member and in variable slip-drive relation with same during intervals of excessive load on the driven member.

12. A device for universally relating driving and driven members in speed-torque driving relation, comprising differential speed-torque sets normally in axially progressive speed-torque driving relations, and a universal normally positively connected couple including a rotatable element formed with a plurality of radially movable portions associated with one of the members and a second rotatable element including radial portion actuators and associated with one of the sets whereby the power necessary to move the portions by the actuators will act to cause all the sets to approach the same speed.

13. A device for effecting and affecting speed drive relations between power transmitting members as a function of the speed of one of the members and the resistance of the other member, comprising speed drive sets each in driving relation with one member and with adjacent sets, one set in driving relation with the other member, and a rotatable couple including rigid actuating elements in driving relation with one of the sets and resilient actuated elements in driving relation with one of the members, said couple arranged to automatically move into and out of slip-drive and non-slip-drive relations as a function of the speed of one of the members and the resistance of the other member, and shiftable means for selectively controlling the slip and non-slip relations of the said couple.

HOWARD J. MURRAY.